United States Patent [19]

Hoch

[11] Patent Number: 5,096,600

[45] Date of Patent: Mar. 17, 1992

[54] METHOD FOR DECONTAMINATING SOILS

[75] Inventor: Robert Hoch, Hensonville, N.Y.

[73] Assignee: SDTX Technologies, Inc., Houston, Tex. ; c/o Captiva Capital

[21] Appl. No.: 516,262

[22] Filed: Apr. 30, 1990

[51] Int. Cl.$^5$ .............................. C02F 1/68; C22B 7/00
[52] U.S. Cl. .................................... 210/751; 210/749; 210/908; 210/909; 210/925; 423/DIG. 20; 405/128; 208/262.5
[58] Field of Search ............... 210/749, 751, 634, 908, 210/909, 925; 423/DIG. 20; 405/128; 134/50; 208/262 S

[56] References Cited

U.S. PATENT DOCUMENTS 4,327,027 4/1982 Howard et al. .................. 208/262.5
4,447,262 5/1984 Gay et al. ............................ 210/909

*Primary Examiner*—Robert A. Dawson
*Assistant Examiner*—David Reifsnyder
*Attorney, Agent, or Firm*—Curtis, Morris & Safford

[57] ABSTRACT

A method for substantially degrading and detoxifying soils contaminated with haloorganic compounds is shown. The method comprises contacting a soil, sediment, or sludge containing less that 5% by weight of a haloorganic contaminant, with a reagent of the formula MX, where M is a metal selected from the group consisting of K, Na, Ca, Zn, Mg, Ba, Pb, and X is hydroxide, carbonate, oxide, or acetate. The contact and subsequent reaction is carried out under conditions which insure the phase compatibility of the haloorganic contaminant and the reagent, and preferably under anhydrous conditions. The contact is carried out for a time sufficient to effect the dehalogenation of at least 90% of the contaminant.

37 Claims, No Drawings

METHOD FOR DECONTAMINATING SOILS

This invention relates to the treatment of soils, sludges, and sediments to degrade and detoxify halogenated organic contaminants. More specifically, this invention relates to efficient methods to degrade PCBs in contaminated soil with a minimum of costly reagents.

Soils containing halogenated organic compounds have posed serious environmental hazards. The halogenated organic compounds are toxic to both plants and animals, are known to bioaccumulate and present serious health hazards. It has been observed that halogenated organic compounds, in particular PCBs, have extremely slow biodegradation rates and their persistence and toxicity have prompted serious governmental action restricting their use and application. Even trace amounts of PCBs are environmentally undesirable.

Among the halogenated compounds which pose dangers to the environment are halogenated aliphatic compounds, e.g., trichloroethylene, and chlorinated aromatic compounds, e.g., polychlorinated biphenyls (PCBs). Prior to 1970, PCBs were used in a wide range of applications due to their attractive physical properties. They were used as plasticizers, waterproofing compounds, lubricants, heat transfer fluids, hydraulic fluids, etc. Their primary use was in the electrical industry as dielectric media in transformers and capacitors.

A number of methods have been proposed for treating soils containing halogenated organic compounds. Incineration, while an approved method, is expensive and hazardous if uncontrolled. Other methods are based on the use of fairly large amounts of expensive reagents or the need to treat the soil with solvents to extract the PCBs and subsequently dehalogenate them in the extract.

None of the prior art methods have been entirely satisfactory from the standpoint of technical efficacy or economics, and the art has sought alternative methods for the treatment of soils, sediments, and sludges with a minimum of inexpensive reactant to achieve the substantially complete dehalogenation of haloorganic contaminants without unnecessary and costly process steps, equipment, and capital costs.

OBJECTS OF THE INVENTION

It is thus a primary object of this invention to provide a cost effective method for the substantially complete dehalogenation of trace haloorganic contaminants in soils, sediments, or sludges.

It is a further object of this invention to provide methods for detoxifying soils using a minimum of added reagents and other adjuvants.

It is still further object of this invention to detoxify soils rapidly and substantially completely so as to reduce the quantity of residual haloorganic compounds in the soils to less than the levels mandated by applicable regulations.

SUMMARY OF THE INVENTION

It has now been discovered that trace haloorganic contaminants in soils, sediments, and sludges can be substantially completely dehalogenated by contacting the soil with a reagent of the formula MX, where M is a metal selected from the group consisting of K, Na, Ca, Zn, Mg, Ba, Pb, and X is hydroxide, carbonate, oxide, or acetate, under conditions which ensure the phase compatibility of the haloorganic contaminants and the reagent for a time sufficient to effect the dehalogenation of at least 90% of the contaminants. In preferred methods, the phase compatibility is achieved by conducting the contact reaction at elevated temperature and/or in the presence of phase compatibility agents.

DETAILED DESCRIPTION OF THE INVENTION AND PREFERRED EMBODIMENTS

Definitions

Haloorganic contaminants include halogenated, in particular chlorinated and brominated, aromatic and aliphatic compounds. Representative of such compounds are chlorinated and polychlorinated phenols and benzenes. Representative of the halogenated aliphatic compounds are trichloroethylene and carbon tetrachloride. Halogenated compounds which are frequently found in contaminated soils include PCBs, complex polychlorinated biphenyls, e.g., dichlorodiphenyltrichloroethylene (DDT), dioxins, tetrachlorodibenzofurans, and commercial mixtures known as Arochlors.

The terms "soil," "sediment," and "sludge" are used herein in their normally accepted usage. From time to time, the word "soil" is used to represent soils, sediments, and sludges.

By "substantially complete dehalogenation of organic contaminants" is meant the removal of substantially all of the halo atoms from all of the haloorganic compounds in the soil, or, the removal of all of the halo atoms from substantially all of the haloorganic compounds in the soil, or, the removal of substantially all of the halo atoms from substantially all of the haloorganic compounds in the soil. Where percentages of dehalogenation are expressed, they are meant to quantify the total mols of halo atoms removed as a percentage of the total mols of halo atoms in the haloorganic compounds in the soil prior to treatment, although one skilled in the art will recognize that some compounds may be completely dehalogenated, others only partially dehalogenated, and a small percentage unaffected.

By "detoxification" or "detoxify" is meant removal of only that number of halo atoms necessary to convert, e.g., a highly chlorinated PCB (hexachlorobiphenyl) into a less toxic form, e.g., dichlorobiphenyl. Less highly chlorinated PCBs are less toxic and are more easily metabolized by bacterial action in the treated soil.

By "phase compatibility" is meant that the reagent, which is a salt, is caused to have sufficient solubility in the trace haloorganic contaminant or in another oil in the soil or in an extrinsically added substance so that the dehalogenation reaction can proceed.

DETAILED DESCRIPTION

In its broadest aspect, the method of the invention comprises the step of contacting a soil, sediment, or sludge containing less than 5% by weight of a haloorganic contaminant, with a reagent of the formula MX, where M is a metal selected from the group consisting of K, Na, Ca, Zn, Mg, Ba, Pb, and X is hydroxide, carbonate, oxide, or acetate. The contact and subsequent reaction is carried out under conditions which insure the phase compatibility of the haloorganic contaminant and the reagent, and, preferably under anhydrous conditions. The contact is carried out for a time sufficient to effect the dehalogenation of at least 90% of the contaminant.

The contact reaction is believed to proceed stoichiometrically, and while other adjuvants, catalysts, reactants, etc., may be added to the soil, the invention is advantageously carried out with a reagent consisting essentially of the compound MX. The preferred reagents include the hydroxides, carbonates, and oxides of potassium, sodium, and calcium.

Phase compatibility of the haloorganic contaminant and the reagent can be achieved by raising the contact reaction temperature sufficiently to cause the reagent salt MX to dissolve in the contaminant or in an oil within the soil in which the contaminant is dissolved, and/or by adding an extrinsic phase compatibilizing agent. It is well known that salts such as the reagent MX and the haloorganic compounds being degraded by the methods of this invention, and in fact, most other organic solvents in which the haloorganic contaminants are soluble, have almost no mutual solubility. In order for a chemical reaction to occur, therefore, all the reactants must be in the same phase. Thus, phase compatibility can be achieved by adding a phase compatibilizing agent in which both the salt and the haloorganic have at least some mutual solubility. Surprisingly, it has been found that even small quantities of phase compatibilizing agent may suffice to achieve the mutual solubility necessary to conduct the reaction.

Desirably the temperature of the contact is above 180° C. and preferably is above 200° C. in order to ensure the condition of phase compatibility. Lower temperatures, e.g., 150° C., can be used if an effective amount of a phase compatibilizing agent is employed.

The phase compatibility agents used in the methods of the invention ar selected from the group consisting of (a) alcohols, including glycols, polyalkylene glycols, and polyols, (b) nitriles, (c) ethers, including polyethers, cyclic ethers, lower alkyl ethers of glycols, and lower alkyl ethers of polyalkylene glycols, (d) amines, and (e) amides.

Representative alcohols include lower alkanols having from 1 to 6 and preferably 1 to 4 carbon atoms, ethylene and propylene glycol, butanediol, glycerine, polyethylene glycol (PEG), polypropylene glycol (PPG), and commercial polyols. Representative nitriles include acetonitrile, benzonitrile, terephthalonitrile, and adiponitrile. Representative polyalkylene glycols include polyethylene glycol having a molecular weight of less than about 1000. Representative ethers include tetrahydrofuran, methyltertbutyl ether, glyme, diglyme, triglyme, tetraglyme, methyl and ethyl capped polyethylene glycol, and dioxane. Representative amines useful in the methods of the invention as phase compatibilizing agents include triethylamine and trioctylamine, and representative amides include dimethylformamide.

Where the mixture contacted With the contaminated soil includes only the reagent MX and the phase compatibilizing agent (no aprotic solvent being employed as is further described below), phase compatibilizing agents having a lower boiling point may be advantageously used. These include methanol, ethanol, acetonitrile, tetrahydrofuran, methyltertbutyl ether, triethanolamine, and dimethylformamide.

The phase compatibilizing agent is typically present in from 10 to 1000 mols per mol of haloorganic contaminant in the soil and preferably it is used in from 25 to 500 mols per mol of haloorganic compound.

Advantageous results are achieved using a bulk amount, relative to the soil, sediment, or sludge, of an aprotic solvent to serve as a common phase for the contaminant and the reagent MX. The same compound, or different compounds, may serve as the aprotic solvent and the phase compatibilizing agent, respectively.

The aprotic solvents used in the methods of the invention are ethers, including polyethers, lower alkyl ethers of glycols, and lower alkyl ethers of polyalkylene glycols, amines and hydrocarbons. The aprotic solvent should have a boiling point equal to or greater than the temperature of the reaction. Preferred aprotic solvents which meet this criterion are glyme, diglyme, and triglyme, and a preferred amine is trioctylamine.

Where the aprotic solvent is an ether or an amine, it may also serve as the phase compatibilizing agent. Where the aprotic solvent is a hydrocarbon, the reaction temperature must be raised to achieve phase compatibility, the boiling point of the hydrocarbon being equal to or above that temperature, and/or a phase compatibilizing agent must be used. Where a phase compatibilizing agent is used, it, too, must have a boiling point at or above the reaction temperature. Preferred high boiling phase compatibilizing agents include ethylene or propylene glycol, butanediol, glycerine, polyethylene glycol, polypropylene glycol, polyol, benzonitrile, terephthalonitrile, adiponitrile, or various ethers such as glyme, diglyme, triglyme, methyl or ethyl capped polyethylene glycol, and dioxane.

It is preferred to select aprotic solvents which are nontoxic because residues of those solvents may remain in the treated soil. For example, should dimethylsulfoxide—a known dermal penetrant—be selected as an aprotic solvent, residual amounts of that solvent and residual amounts of PCBs in the treated soil would create a very hazardous condition during and after the remediation.

Thus, in the preferred embodiment of the invention, the soil, sediment, or sludge is contacted with a mixture comprising (a) an aprotic solvent, (b) a reagent of the formula MX, and (c) a phase compatibilizing agent. The mixture which is contacted with the soil is basic due to the presence of reagent MX, and the more MX, the higher the pH and the greater the rate of conversion of contaminant. Mixtures having a pH greater than 11.0 are preferred.

In the preferred embodiments of the invention, the weight ratio of the mixture of the aprotic solvent, reactant MX, and phase compatibility agent, to the soil, sediment, or sludge, is less than 2:1 so that a slurry of the soil is not created. Preferably, the weight ratio of the mixture to the soil is less than 1:3 and even more economic results are obtained where the weight ratio is less than 1:9.

The aprotic solvent is used in an amount based on the amount of contaminated soil to be treated. Broadly, the amount of aprotic solvent employed is from 0.1 pound per pound of contaminated soil to 2 pounds per pound of contaminated soil, and is preferably in the range of from 0.25 to 1.5 pounds per pound of contaminated soil. Where the same compound is used as both the aprotic solvent and the compatibilizing agent, the amount of compound used is within the ranges given above for the aprotic solvent.

The amount of reagent MX which is employed is from 1.5 to 100 mols relative to the total mols of halogen contained in the contaminant in the soil and preferably from 2.0 to 25 mols are used.

In carrying out the methods of the invention, it is important to conduct the reaction under substantially anhydrous conditions. Typically, water may be present in a soil, sediment, or sludge in excess of 20% by weight, and in such circumstances, it is important to remove that water by heat or inert gas stripping before the contact of the reactant MX and the contaminant takes place, and preferably before the reactant MX is even introduced to the contaminated soil.

Alternatively, where the soil, sediment, or sludge contains, e.g., in excess of 20% water, and water removal is disadvantageous or otherwise contraindicated, greater amounts of an aprotic solvent can be employed to overcome the otherwise deleterious effect of water on the reaction system.

The methods of the invention can be used to reduce the level of haloorganic contaminants, e.g., aromatic polychloroorganics from, e.g., about 1% by weight in the soil to less than 100 ppm. Using the preferred conditions described below, it is possible to reduce the residual contaminant to less than 50 ppm or even less than 10 ppm in the treated soil.

The invention is further described in the following examples.

EXAMPLE I 100 lbs. (on a dry basis) of soil containing 1740 ppm of PCBs as determined by hexane extraction followed by GC/MS is charged to a reaction zone along with 5 lbs. of NaOH. The mixture is held at 320° C. for one hour.

Analysis of the soil discharged indicates a PCB content of 1.99 ppm. This exemplifies phase compatibilization by high temperature operation.

EXAMPLE II 100 lbs. (on a dry basis) of soil containing 1740 ppm of PCBs as determined by hexane extraction followed by GC/MS is admixed with 150 lbs. of triglyme and 5 lbs. of NaOH. The mixture is held at 200° C. for one hour. A result similar to Example I is obtained. This illustrates the use of one compound, triglyme, as a phase compatibilization agent and aprotic solvent.

EXAMPLE III 100 lbs. (on a dry basis) of soil containing 1740 ppm of PCBs as determined by hexane extraction followed by GC/MS is admixed with 150 lbs. of diesel oil and 5 lbs. of KOH and 10 lbs of acetonitrile. The mixture is held at 200° C. for one hour. A result similar to Example I is obtained. This illustrates the use of a hydrocarbon aprotic solvent and a phase compatibilization agent.

EXAMPLE IV 100 lbs. (on a dry basis) of soil containing ppm of PCBs as determined by hexane extraction followed by GC/MS is admixed with 150 lbs. of edible food grade oil and 5 lbs. of KOH and 10 lbs of acetonitrile. The mixture is held at 200° C. for one hour. A result similar to Example I is obtained. This illustrates the use of a different aprotic solvent and phase compatibilization agent.

What is claimed is:

1. A method for the substantially complete dehalogenation of trace haloorganic contaminants in a soil, sediment, or sludge comprising the step of contacting a soil, sediment, or sludge containing less than 5% by weight of a haloorganic contaminant with a reagent of the formula MX, where M is a metal selected from the group consisting of K, Na, Ca, Zn, Mg, Ra, and Pb, and X is hydroxide, carbonate, oxide, or acetate, in the presence of a phase compatibilizing agent, for a time sufficient to effect the dehalogenation of at least 90% of said contaminant.

2. A method as recited in claim 1, wherein the temperature of said contact is above 180° C. and said contact takes place under substantially anhydrous conditions.

3. A method as recited in claim 1, wherein said temperature is above 200° C.

4. A method as recited in claim 1, wherein said phase compatibility is achieved by maintaining the contact of said reagent and soil, sediment, or sludge at a temperature above 150° C. and introducing an effective amount of a phase compatibilizing agent.

5. A method as recited in claim 4, wherein said phase compatibility agent is selected from the group consisting of alcohols, nitriles, ethers, amines, and amides.

6. A method for the substantially complete dehalogenation of trace haloorganic contaminants in a soil, sediment, or sludge comprising the step of contacting a soil, sediment, or sludge containing less than 5% by weight of a haloorganic contaminant with a mixture containing
   (a) an aprotic solvent; and
   (b) a reagent of the formula MX, where M is a metal selected from the group consisting of K, Na, Ca, Zn, Mg, Ba, and Pb, and X is hydroxide, carbonate, oxide, or acetate;
under conditions which ensure the phase compatibility of said haloorganic contaminant and said reagent, for a time sufficient to effect the dehalogenation of at least 90% of said contaminant.

7. A method as recited in claim 6, wherein said phase compatibility is achieved by maintaining the contact of said reagent and said soil, sediment, or sludge at a temperature above 150° C. and introducing an effective amount of a phase compatibilizing agent.

8. A method as recited in claim 6, wherein the aprotic solvent is a hydrocarbon.

9. A method as recited in claim 8, wherein the hydrocarbon has a boiling point equal to or greater than the temperature of the reaction.

10. A method for the detoxification of trace haloorganic contaminants in a soil, sediment, or sludge comprising the step of contacting a soil, sediment, or sludge containing less than 5% by weight of a haloorganic contaminant with a mixture containing
    (a) an aprotic solvent;
    (b) a reagent of the formula MX where M is a metal selected from the group consisting of K, Na, Ca, Zn, Mg, Ba, and Pb, and X is hydroxide, carbonate, oxide, or acetate; and
    (c) a phase compatibilizing agent for said haloorganic compound and said reagent,
for a time sufficient to effect the dehalogenation of at least 90% of said contaminant.

11. A method as recited in claim 10, wherein the contaminant is an aromatic polychloroorganic.

12. A method as recited in claim 10, wherein the contaminant is trichloroethylene.

13. A method as recited in claim 10, wherein the contaminant is a dioxin.

14. A method as recited in claim 10, wherein the temperature at which said contact takes place is above 180° C.

15. A method as recited in claim 10, wherein the weight ratio of said mixture to said soil, sediment, or sludge is less than 2:1.

16. A method for the substantially complete detoxification of aromatic polychloroorganics in a soil, sediment, or sludge comprising the step of contacting a contaminated soil, sediment, or sludge containing less than 1% by weight of aromatic polychloroorganics, under anhydrous conditions, with a mixture containing
   (a) a hydrocarbon solvent,
   (b) from 1.5 to 100 molar equivalents, relative to the total moles of halo atoms in said contaminant in said soil, sediment, or sludge, of a reagent of the formula MX where M is a metal selected from the group consisting of K, Na, and Ca and X is hydroxide, carbonate, or oxide, and (c) from 10 to 100 moles, relative to the total moles of aromatic polychloroorganic contaminant, of a phase compatibilizing agent selected from the group consisting of alcohols, ethers, nitriles, amines, and amides, at a temperature above 180° C. for from 15 to 250 minutes,
to lower the content of residual contaminant in said soil to less than 100 ppm.

17. A method for the substantially complete dehalogenation of trace trichloroethylene contaminant in a soil, sediment, or sludge comprising the step of contacting a soil, sediment, or sludge containing less than 5% by weight of trichloroethylene with a reagent of the formula MX, where M is a metal selected from the group consisting of K, Na, Ca, Zn, Mg, Ba, and Pb, and X is hydroxide, carbonate, oxide, or acetate, in the presence of a phase compatibilizing agent, for a time sufficient to effect the dehalogenation of at least 90% of said contaminant.

18. A method for the substantially complete dehalogenation of trace haloorganic contaminants in a soil, sediment, or sludge comprising the step of contacting a soil, sediment, or sludge containing less than 5% by weight of a haloorganic contaminant with a reagent of the formula MX present in from 1.5 to 100 mols per total mols of halo atom in said contaminant, where M is a metal selected from the group consisting of K, Na Ca, Zn, Mg, Ba, and Pb, and X is hydroxide, carbonate, oxide, or acetate, at a temperature above 150° C., in the presence of a phase compatibilizing agent present in from 10 to 1000 mols per mol of haloorganic contaminant in said soil, sediment, or sludge, for a time sufficient to effect the dehalogenation of at least 90% of said contaminant.

19. A method for the substantially complete dehalogenation of trace haloorganic contaminants in a soil, sediment, or sludge comprising the step of contacting a soil, sediment, or sludge containing less than 5% by weight of a haloorganic contaminant with a mixture containing
   (a) an aprotic solvent; and
   (b) a reagent of the formula MX, where M is a metal selected from the group consisting of K, Na, Ca, Zn, Mg, Ba, and Pb, and X is hydroxide, carbonate, oxide, or acetate;
at a temperature sufficiently high to ensure the phase compatibility of said haloorganic contaminant and said reagent without an extrinsically added phase compatibilizing agent, for a time sufficient to effect the dehalogenation of at least 90% said contaminant.

20. A method as recited in claim 19, wherein said aprotic solvent is an ether or amine and serves as the phase compatibilizing agent.

21. A method as recited in claim 19, wherein the temperature of said contact is above 180° C. and said contact takes place under substantially anhydrous conditions.

22. A method for the substantially complete dehalogenation of trace haloorganic contaminants in a soil, sediment, or sludge comprising the step of contacting a soil, sediment, or sludge containing less than 5% by weight of a haloorganic contaminant with a mixture containing
   (a) an aprotic solvent;
   (b) a reagent of the formula MX, where M is a metal selected from the group consisting of K, Na, Ca, Zn, Mg, Ba, and Pb, and X is hydroxide, carbonate, oxide, or acetate; and
   (c) a phase compatibilizing agent present in from 10 to 1000 mols per mol of haloorganic contaminant in said soil, sediment, or sludge, and selected from the group consisting of alcohols, nitriles, ethers, amines, and amides;
   the phase compatibility of said reagent and said soil, sediment, or sludge achieved by maintaining the temperature of said contact above 150° C., and for a time sufficient to effect the dehalogenation of at least 90% of said contaminant.

23. A method as recited in claim 22, wherein the phase compatibilizing agent has a boiling point equal to or above the temperature of the reaction.

24. A method for the detoxification of trace haloorganic contaminants in a soil, sediment, or sludge comprising the step of contacting a soil, sediment, or sludge containing less than 5% by weight of a haloorganic contaminant with a mixture containing
   (a) an aprotic solvent selected from the group consisting of amines, ethers, and hydrocarbons;
   (b) a reagent of the formula MX, where M is a metal selected from the group consisting of K, Na, Ca, Zn, Mg, Ba, and Pb, and X is hydroxide, carbonate, oxide, or acetate; and
   (c) a phase compatibilizing agent for said haloorganic compound and said reagent,
for a time sufficient to effect the dehalogenation of at least 90% of said contaminant.

25. A method as recited in claim 24, wherein said contact takes place under substantially anhydrous conditions.

26. A method as recited in claim 24, wherein the pH of said mixture is greater than 11.0.

27. A method as recited in claim 24, wherein said aprotic solvent and said phase compatibilizing agent are the same compound and are selected from the group consisting of ethers and amines.

28. A method as recited in claim 24, wherein the phase compatibilizing agent is a polyalkylene glycol.

29. A method as recited in claim 24, wherein the weight ration of said mixture to said soil, sediment, or sludge is less than 1:3.

30. A method as recited in claim 24, wherein the amount of aprotic solvent is from 0.1 to 2.0 pounds per pound of contaminated soil.

31. A method as recited in claim 24, wherein the amount of aprotic solvent is from 0.25 to 1.50 pounds per pound of contaminated soil.

32. A method for the substantially complete detoxification of aromatic polychloroorganics in a soil, sediment, or sludge comprising the step of contacting a contaminated soil, sediment, or sludge containing less than 1% by weight of aromatic polychloroorganics, under anhydrous conditions, with a mixture containing
   (a) a hydrocarbon solvent, (b) from 1.5 to 100 molar equivalents, relative to the total moles of halo atoms in said contaminant in said soil, sediment, or sludge, of a reagent of the formula MX where M is a metal selected from the group consisting of K, Na, and Ca and X is hydroxide, carbonate, or oxide, and (c) from 10 to 1000 moles, relative to the total moles of aromatic polychloroorganic contaminant, of a phase compatibilizing agent selected from the group consisting of alcohols, ethers, nitriles, amines, and amides, at a temperature above 180° C. for from 15 to 250 minutes, to lower the content of residual contaminant in said soil to less than 50 ppm.

33. A method as recited in claim 32, wherein the treated soil sediment, or sludge contains less than 10 ppm of contaminant.

34. A method as recited in claim 32, where from 2 to 25 molar equivalents of MX are used relative to the total moles of halo atoms in the contaminant in said soil, sediment, or sludge, 35. A method as recited in claim 32, wherein from 25 to 500 moles of phase compatibilizing agent are employed relative to the moles of contaminant in said soil, sediment, or sludge.

36. A method as recited in claim 32, wherein the contaminant is a PCB.

37. A method as recited in claim 32, wherein the temperature of contact is above 200° C.

* * * * *